(12) United States Patent
Spång

(10) Patent No.: US 10,694,920 B2
(45) Date of Patent: Jun. 30, 2020

(54) METHOD OF OPERATING A DISHWASHER AND A DISHWASHER

(71) Applicant: ELECTROLUX APPLIANCES AKTIEBOLAG, Stockholm (SE)

(72) Inventor: Johan Spång, Stockholm (SE)

(73) Assignee: ELECTROLUX APPLIANCES AKTIEBOLAG, Stockholm (SE)

( * ) Notice: Subject to any disclaimer, the term of this patent is extended or adjusted under 35 U.S.C. 154(b) by 373 days.

(21) Appl. No.: 15/320,677

(22) PCT Filed: Jul. 9, 2014

(86) PCT No.: PCT/EP2014/064725
§ 371 (c)(1),
(2) Date: Dec. 20, 2016

(87) PCT Pub. No.: WO2016/004990
PCT Pub. Date: Jan. 14, 2016

(65) Prior Publication Data
US 2017/0143181 A1    May 25, 2017

(51) Int. Cl.
*A47L 15/42* (2006.01)
*A47L 15/00* (2006.01)
(52) U.S. Cl.
CPC ....... *A47L 15/4285* (2013.01); *A47L 15/0018* (2013.01); *A47L 15/4219* (2013.01); *A47L 15/4225* (2013.01); *A47L 15/4291* (2013.01); *A47L 2401/09* (2013.01); *A47L 2401/30* (2013.01); *A47L 2501/05* (2013.01); *A47L 2501/06* (2013.01); *Y02B 30/52* (2013.01)

(58) Field of Classification Search
None
See application file for complete search history.

(56) References Cited

U.S. PATENT DOCUMENTS

2005/0072022 A1    4/2005  Nagae et al.
2011/0048459 A1*   3/2011  Hesterberg .......... A47L 15/0023
                                                           134/18
2011/0114140 A1    5/2011  Heisele et al.
(Continued)

FOREIGN PATENT DOCUMENTS

CN    200998239 Y    1/2008
CN    102131437 A    7/2011
(Continued)

OTHER PUBLICATIONS

English Machine Translation for EP-2682040 A1.*
(Continued)

*Primary Examiner* — Mikhail Kornakov
*Assistant Examiner* — Pradhuman Parihar
(74) *Attorney, Agent, or Firm* — Alston & Bird LLP

(57) ABSTRACT

Provided is a method of operating a dishwasher including a heat pump circuit, wherein a condensate collection container is associated with an evaporator of the heat pump circuit. The method may include the steps of pumping a washing liquid from a sump of the dishwasher using a pump device, opening a first valve in a condensate conduit connecting the condensate collection container with a suction conduit of the pump device, pumping a condensate from the condensate collection container using the pump device. A dishwasher may also be provided.

18 Claims, 3 Drawing Sheets

(56) References Cited

U.S. PATENT DOCUMENTS

2012/0266924 A1* 10/2012 Boyer ............... A47L 15/4221
　　　　　　　　　　　　　　　　　　　　　　134/198
2014/0041695 A1* 2/2014 Ellingson ............ A47L 15/0076
　　　　　　　　　　　　　　　　　　　　　　134/105

FOREIGN PATENT DOCUMENTS

| CN | 103976702 A | 8/2014 | | |
|---|---|---|---|---|
| EP | 219370 A1 | 2/2010 | | |
| EP | 2682036 A2 * | 1/2014 | ......... | A47L 15/4219 |
| EP | 2682040 A1 * | 1/2014 | ......... | A47L 15/4285 |
| EP | 2692937 A1 * | 2/2014 | ......... | D06F 39/006 |
| EP | 2692937 A1 | 5/2014 | | |
| EP | 2682036 A2 | 8/2014 | | |
| EP | 2682040 A1 | 8/2014 | | |
| EP | 2865313 A1 | 4/2015 | | |

OTHER PUBLICATIONS

English Machine Translation of EP2682036A2.*
Office Action for Chinese Application No. 201480079439.6 dated Sep. 5, 2018, 17 pages.
International Search Report and Written Opinion for Application No. PCT/EP2014/064725 dated Jan. 1, 2016.
Office Action for Chinese Application No. 201480079439.6 dated Apr. 29, 2019, 15 pages.
Office Action for European Application No. 14 739 119.7 dated Dec. 10, 2019, 4 pages.

\* cited by examiner

METHOD OF OPERATING A DISHWASHER AND A DISHWASHER

CROSS-REFERENCE TO RELATED APPLICATIONS

This application is a national stage application filed under 35 U.S.C. § 371 of International Application No. PCT/EP2014/064725 filed Jul. 9, 2014, which application is hereby incorporated by reference in its entirety.

TECHNICAL FIELD

The present invention relates to a method of operating a dishwasher. The present invention further relates to a dishwasher.

BACKGROUND

Dishwashers utilizing a heat pump circuit for heating washing liquid are known in the art. The heat pump circuit comprises an evaporator, a compressor, and a condenser.

EP 2682036 discloses a method for heating washing liquid in a dishwasher. The dishwasher comprises a heat pump. The method involves conducting supply air to an evaporator of the heat pump. Air delivers heat energy to a refrigerant within the evaporator. The evaporated refrigerant is compressed by a compressor. The compressed refrigerant condenses within a condenser and delivers heat energy to washing liquid. Water vapour of the air is condensed within the evaporator. Condensed water vapour of the air, i.e. condensate, is collected in a condensate container and supplied to a washing chamber of the dishwasher. The dishwasher comprises a condensate pump for pumping the condensate into the washing chamber.

SUMMARY

It is an object of the present invention to provide a cost-efficient method of disposing of condensate in a dishwasher comprising a heat pump circuit.

According to an aspect of the invention, the object is achieved by a method of operating a dishwasher. The dishwasher comprises a washing chamber, a pump device for pumping a washing liquid, a washing liquid circulation circuit, and a heat pump circuit. The heat pump circuit comprises a condenser, an expansion device, an evaporator, and a compressor. The washing liquid circulation circuit comprises a sump arranged at a bottom portion of the washing chamber, a conduit portion in thermal communication with the condenser, and at least one nozzle arranged in the washing chamber. A condensate collection container is associated with the evaporator. The method comprises steps of:

pumping a washing liquid from the sump using the pump device, opening a first valve in a condensate conduit connecting the condensate collection container with a suction conduit of the pump device, and pumping a condensate from the condensate collection container using the pump device.

Since the condensate is pumped using the same pump device which is used for pumping washing liquid from the sump, no separate pump for pumping the condensate is required. Thus, costs for producing and operating the dishwasher may be reduced. As a result, the above mentioned object is achieved.

When the pump device is running and the first valve is open, the negative pressure in the suction conduit also prevails in the condensate conduit. Thus, the pump device may pump condensate from the condensate collection container. This may be done simultaneously as pumping washing liquid from the sump through the suction conduit.

Dishes to be washed may be placed in the washing chamber of the dishwasher. From the at least one nozzle washing liquid is sprayed into the washing chamber and onto the dishes. Washing liquid sprayed into the washing chamber is eventually collected in the sump to be circulated back to the at least one nozzle. Thus, it may be said that the washing chamber forms part of the washing liquid circulation circuit.

A refrigerant circulates inside the heat pump circuit and heats washing liquid via the conduit portion in thermal communication with the condenser of the heat pump circuit. Water vapour of air coming in contact with an outer surface of the evaporator condenses and forms the condensate.

The condensate collection container being associated with the evaporator entails that the condensate collection container is arranged in relation to the evaporator such that condensate which condenses on the outer surface of the evaporator flows into the condensate collection container. For instance, the condensate collection container may be arranged substantially below the evaporator such that condensate simply drips from the evaporator into the condensate collection container, or the condensate collection container may be arranged laterally of the evaporator and a funnel beneath the evaporator may guide the condensate into the condensate collection container.

According to embodiments, the step of pumping a condensate from the condensate collection container may comprise a step of emptying the condensate collection container. In this manner the entire condensate collection container may be emptied while the first valve is open.

According to embodiments, the step of opening the first valve may be preceded by a step of sensing an upper threshold condensate level in the condensate collection container. In this manner the condensate collection container may be emptied only when the condensate level has reach a predetermined threshold level in the condensate collection container.

According to embodiments, the dishwasher may comprise an electric motor for driving the pump device, and the method may comprise steps of:

sensing an electric current of the electric motor during the step of pumping the condensate from the condensate collection container, and closing the first valve when a change in the electric current of the electric motor is sensed. The change in electric current may indicate that air reaches the pump device and accordingly, that the condensate collection container is empty. In this manner the method may comprise an easy way of determining when to close the first valve.

According to embodiments, the method may comprise steps of:

sensing a lower threshold condensate level in the condensate collection container during the step of pumping the condensate from the condensate collection container, and closing the first valve in response to sensing the lower threshold level. In this manner an alternative way of determining when to close the first valve may be provided.

According to embodiments, the method may comprise a step of closing the first valve when a predetermined period of time has passed from opening the first valve. In this manner is may be ensured that first valve does not remain open over longer periods of time.

According to embodiments, the dishwasher may comprise a second valve arranged in the suction conduit upstream a connection position between the suction conduit and the condensate conduit, and the method may comprise a step of:
closing the second valve in connection with the step of opening the first valve. In this manner the pump device may pump only condensate from the condensate collection container and no washing liquid in the washing liquid circulation circuit. The step of closing the second valve and a subsequent opening of the second valve may be performed while the pump device is continuously running.

According to embodiments, the pump device may be a circulation pump arranged in the washing liquid circulation circuit, and wherein the step of pumping a washing liquid from the sump may comprise:
a step of circulating a washing liquid in the washing liquid circulation circuit using the circulation pump. In this manner the condensate may be pumped from the condensate collection container into the washing liquid circulation circuit. The condensate may later be disposed of together with the washing liquid when it is emptied from the dishwasher.

According to embodiments, the pump device may be a drain pump connected to the sump and to a washing liquid outlet of the dishwasher, and wherein the step of pumping a washing liquid from the sump may comprise
a step of draining a washing liquid from the sump to the washing liquid outlet using the drain pump. In this manner the condensate may be disposed of while emptying the dishwasher of washing liquid.

According to a further aspect of the invention the above-mentioned object is achieved by a dishwasher comprising a washing chamber, a pump device for pumping a washing liquid from a sump, a washing liquid circulation circuit, and a heat pump circuit. The heat pump circuit comprises a condenser, an expansion device, an evaporator, and a compressor. The washing liquid circulation circuit comprises the sump arranged at a bottom portion of the washing chamber, a conduit portion in thermal communication with the condenser, and at least one nozzle arranged in the washing chamber. A condensate collection container is associated with the evaporator. The dishwasher further comprises a condensate conduit connecting the condensate collection container with a suction conduit of the pump device and a first valve arranged in the condensate conduit, such that when the first valve is open the pump device is able to pump a condensate from the condensate collection container.

According to embodiments, the dishwasher may comprise a control unit configured to control the dishwasher in accordance with any aspect and/or embodiment of methods disclosed herein.

Further features of, and advantages with, the present invention will become apparent when studying the appended claims and the following detailed description.

BRIEF DESCRIPTION OF THE DRAWINGS

Various aspects of the invention, including its particular features and advantages, will be readily understood from the example embodiments discussed in the following detailed description and the accompanying drawings, in which.

DETAILED DESCRIPTION

Aspects of the present invention will now be described more fully. Like numbers refer to like elements throughout. Well-known functions or constructions will not necessarily be described in detail for brevity and/or clarity.

Figure 1:
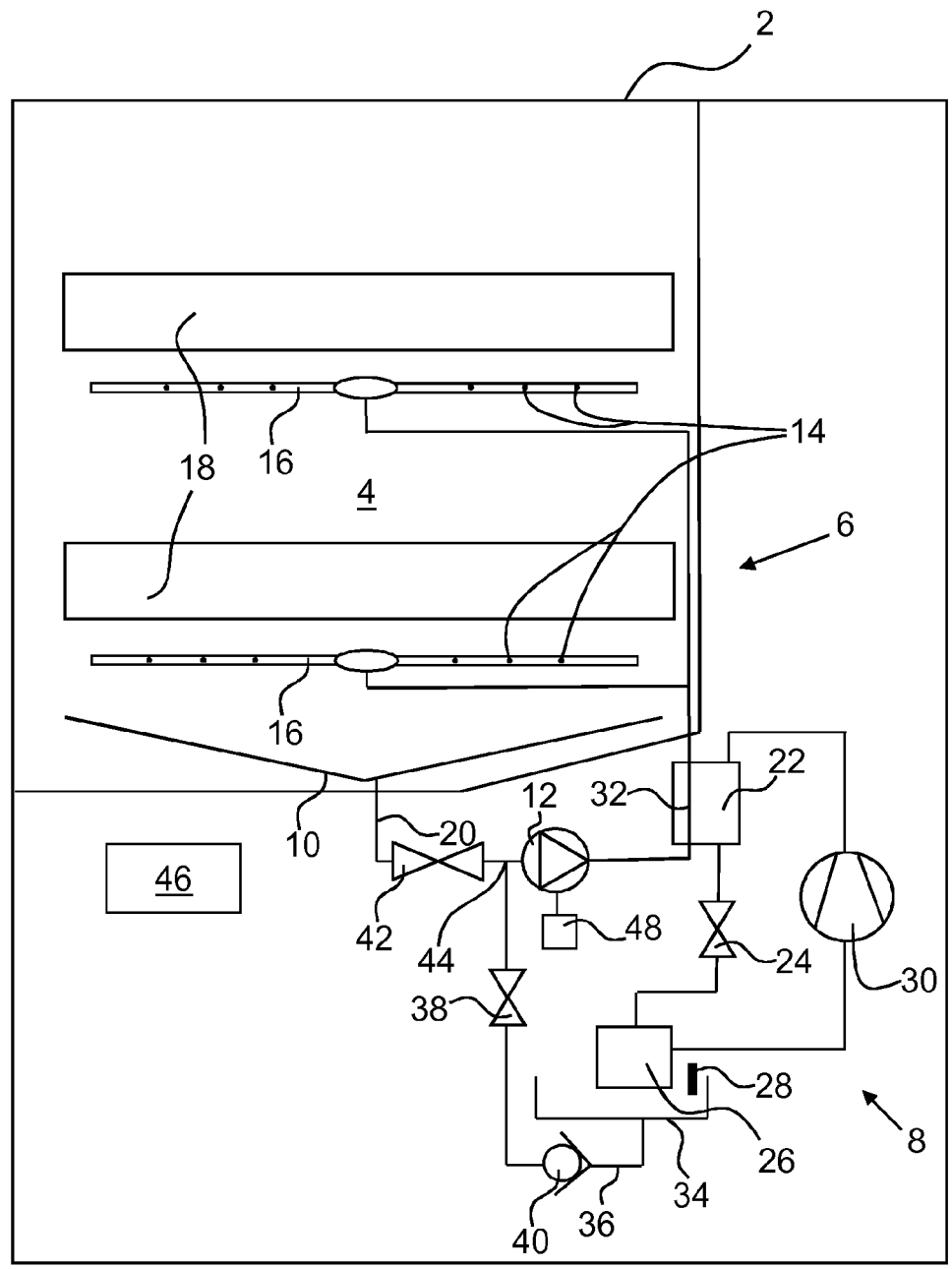
FIGS. 1 and 2 schematically illustrate cross sections through dishwashers according to embodiments.

FIG. 1 schematically illustrates a cross section through a dishwasher 2 according to embodiments. The dishwasher 2 comprises a washing chamber 4, a washing liquid circulation circuit 6, and a heat pump circuit 8.

The washing liquid circulation circuit 6 comprises a sump 10 arranged at a bottom portion of the washing chamber 4, a circulation pump 12 for circulating washing liquid through the washing liquid circulation circuit 6, and at least one nozzle 14 arranged in the washing chamber 4. In these embodiments the washing liquid circuit 6 further comprises conduits and rotating arms 16, in which the at least one nozzle 14 is provided. The circulation pump 12 pumps the washing liquid to the rotating arms 16 and the at least one nozzle 14, wherefrom the washing liquid is distributed in the washing chamber 4. In the washing chamber 4 two trays 18 are provided for holding dishes to be washed. The washing liquid distributed in the washing chamber 4 is collected in the sump 10, from where it is led back to the circulation pump 8 via a suction conduit 20. After use, the washing liquid may be emptied from the dishwasher 2 via non-shown means.

The heat pump circuit 8 comprises a condenser 22, an expansion device 24, an evaporator 26, and a compressor 30. The expansion device 24 has been illustrated in the form of an expansion valve, but may be formed alternatively e.g. by a capillary tube. A conduit portion 32 of the washing liquid circulation circuit is arranged in thermal communication with the condenser 22. Thus, washing liquid is heated in the conduit portion 32 as refrigerant circulating in the heat pump circuit 8 driven by the compressor 30 condenses in the condenser 22 and transfers heat to the washing liquid. Optionally, a heating element (not shown) for heating the washing liquid may be provided in the washing liquid circulation circuit, in addition to the conduit portion 32 in thermal communication with the condenser 22.

Since an outer surface of the evaporator 26 is cooled by evaporating refrigerant inside the evaporator 26 during operation of the heat pump circuit 8, water vapour in ambient air condenses on the outer surface of the evaporator and forms condensate. Under humid conditions substantial amounts of condensate may condensate on the outer surface of the evaporator 26. Thus, a condensate collection container 34 is associated with the evaporator 26, i.e. the condensate collection container 34 is arranged to collect condensate from the evaporator 26. A condensate conduit 36 connects the condensate collection container 34 with the suction conduit 20 of the circulation pump 12. A first valve 38 is arranged in the condensate conduit 36. Thus, when the first valve 38 is open the circulation pump 12 is able to pump a condensate from the condensate collection container 34. That is, the negative pressure created in the suction conduit 20 by the circulation pump sucks the condensate into the washing liquid circulation circuit 6. In these embodiments the condensate collection container 34 is arranged below the sump 10 and below the circulation pump 12. The negative pressure in the suction conduit 20 suffices to pump condensate from the condensate collection container 34 into the washing liquid circuit 6. The condensate collection container 34 may alternatively be arranged at a level between the circulation pump 12 and the sump 10, or at a level higher than the circulation pump 12 and the sump 10.

The circulation pump 12 forms a pump device for pumping a washing liquid from the sump 10 in accordance with the present invention. Accordingly, in these embodiments the pump device is a circulation pump 12 arranged in the washing liquid circulation circuit 6.

The dishwasher 2 comprises an electric motor 48 for driving the pump device, i.e. for driving the circulation pump 12. The electric motor 48 may be e.g. a brushless electric motor, a synchronous electric motor, or an asynchronous electric motor.

A check valve 40 is arranged in the condensate conduit 36. Thus, in case of malfunction of the first valve 38, draining of the washing liquid circulation circuit 6 via the condensate conduit 36 to the condensate collection container 34 may be prevented.

A condensate level sensor 28 of a suitable kind may be provided in the condensate collection container 34. The condensate level sensor 28 may sense an upper threshold condensate level in the condensate collection container 34. When the upper threshold condensate level is sensed, the condensate collection container 34 may be filled with condensate, or substantially filled with condensate, and the first valve 38 may be opened to empty the condensate collection container 34. If the condensate level sensor is omitted, an alternative may be to open the first valve 38 at regular time intervals to empty the condensate collection container 34.

A condensate level sensor 28 may additionally, or alternatively, be arranged to sense a lower threshold condensate level in the condensate collection container 34, i.e. sensing that the condensate collection container 34 is empty, or substantially empty.

In FIG. 1 a second valve 42 arranged in the suction conduit 20 upstream a connection position 44 between the suction conduit 20 and the condensate conduit 36 has been illustrated. The second valve 42 may be closed while the first valve 38 is open, or for at least some of the time while the first valve 38 is open. The second valve 42 may not be required in some embodiments and thus, has been illustrated to show alternative embodiments.

Figure 2:
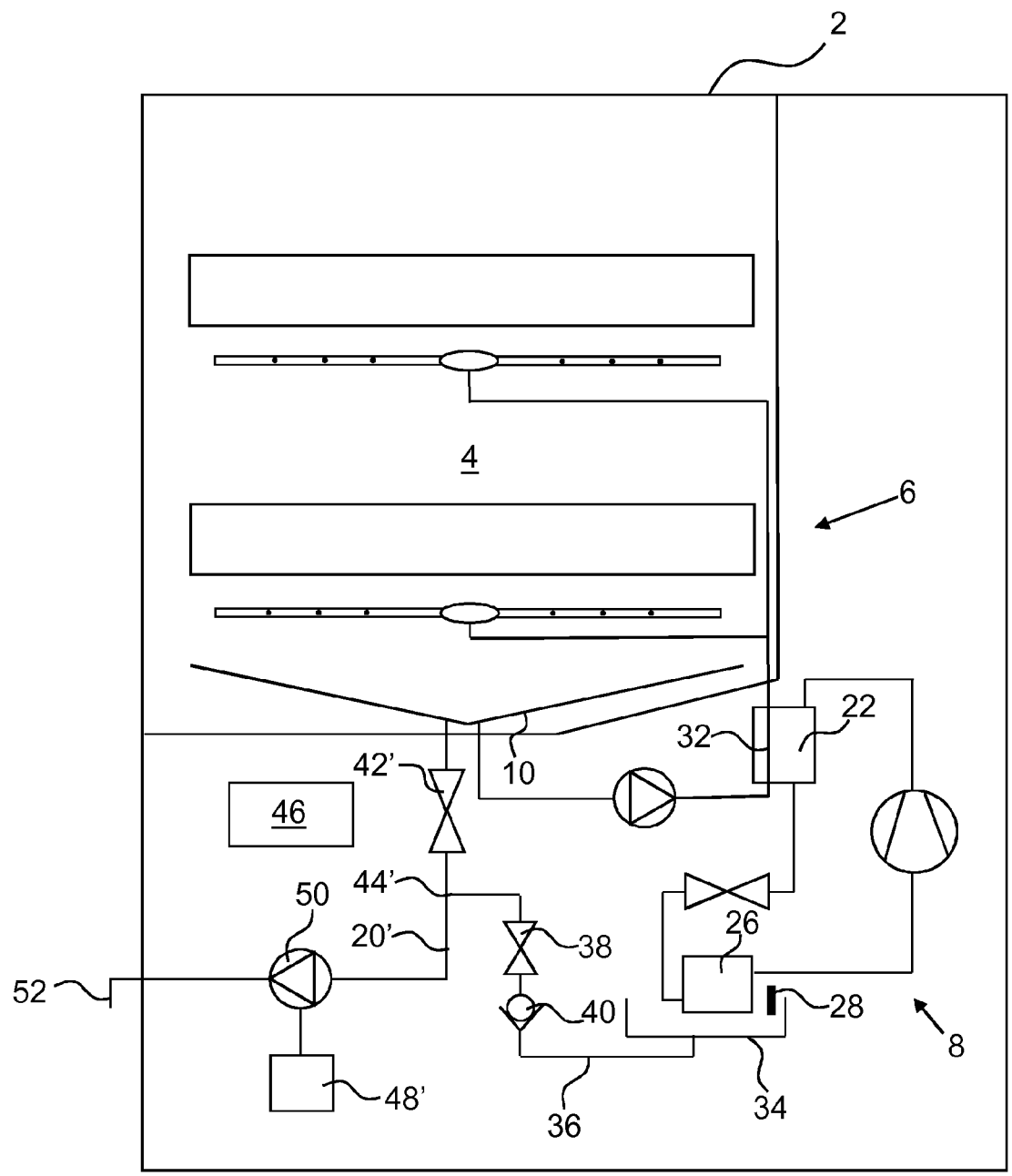

FIG. 2 schematically illustrates a cross section through a dishwasher 2 according to embodiments. These embodiments resemble in much the embodiments of FIG. 1. The main differences between the embodiments of FIG. 2 and those of FIG. 1 will be discussed below.

Again, the dishwasher 2 comprises a washing chamber 4, a washing liquid circulation circuit 6, and a heat pump circuit 8. Again, a conduit portion 32 of the washing liquid circulation circuit 6 is arranged in thermal communication with the condenser 22 of the heat pump circuit 8, and a condensate collection container 34 is associated with the evaporator 26.

A condensate conduit 36 connects the condensate collection container 34 with a suction conduit 20' of a pump device for pumping a washing liquid from the sump 10. In these embodiments, the pump device is a drain pump 50 connected to the sump 10 and to a washing liquid outlet 52 of the dishwasher 2. Thus, in these embodiments the drain pump 50 forms a pump device for pumping a washing liquid from the sump 10 in accordance with the present invention.

A first valve 38 is arranged in the condensate conduit 36. Thus, when the drain pump 50 is driven by its electric motor 48' to drain the sump 10 from washing liquid and the first valve 38 is open, the drain pump 50 pumps condensate from the condensate collection container 34. That is, the negative pressure created in the suction conduit 20' by the drain pump 50 sucks the condensate into the suction conduit 20' and via the drain pump 50 to the washing liquid outlet 52.

In FIG. 2 a second valve 42' arranged in the suction conduit 20' upstream a connection position 44' between the suction conduit 20' and the condensate conduit 36 has been illustrated. The second valve 42' may be closed while the first valve 38 is open, or for at least some of the time while the first valve 38 is open. The second valve 42' may not be required in some embodiments and thus, has been illustrated to show alternative embodiments.

The dishwashers 2 disclosed in FIGS. 1 and 2 are arranged to perform methods according to aspects and/or embodiments discussed herein. Inter alia, for this purpose each dishwasher 2 comprises a control unit 46. The control unit 46 may be arranged to control at least one washing operation of the dishwasher 2, including control the opening and closing of the first valve 38, and if present the second valve 42, 42'. The control unit 46 may be connected to the condensate level sensor 28. The control unit 46 further may be configured to sense an electric current of the electric motor 48, 48' while pumping the condensate from the condensate collection container 34. A change in electric current may indicate that air reaches the pump device 12, 50 via the condensate conduit 36. Accordingly, the condensate collection container 34 may be empty and the control unit 46 may close the first valve 38.

A user of the dishwashers 2 may select a washing program in the control unit 46 via a non-shown control panel. A washing program may comprise one or more different washing operations such as pre-rinsing, washing with detergent, and after-rinsing. Thus, washing liquid in the dishwashers 2 may comprise cold or heated plain water, heated water containing detergent, as well as water containing rinsing agent.

Figure 3:
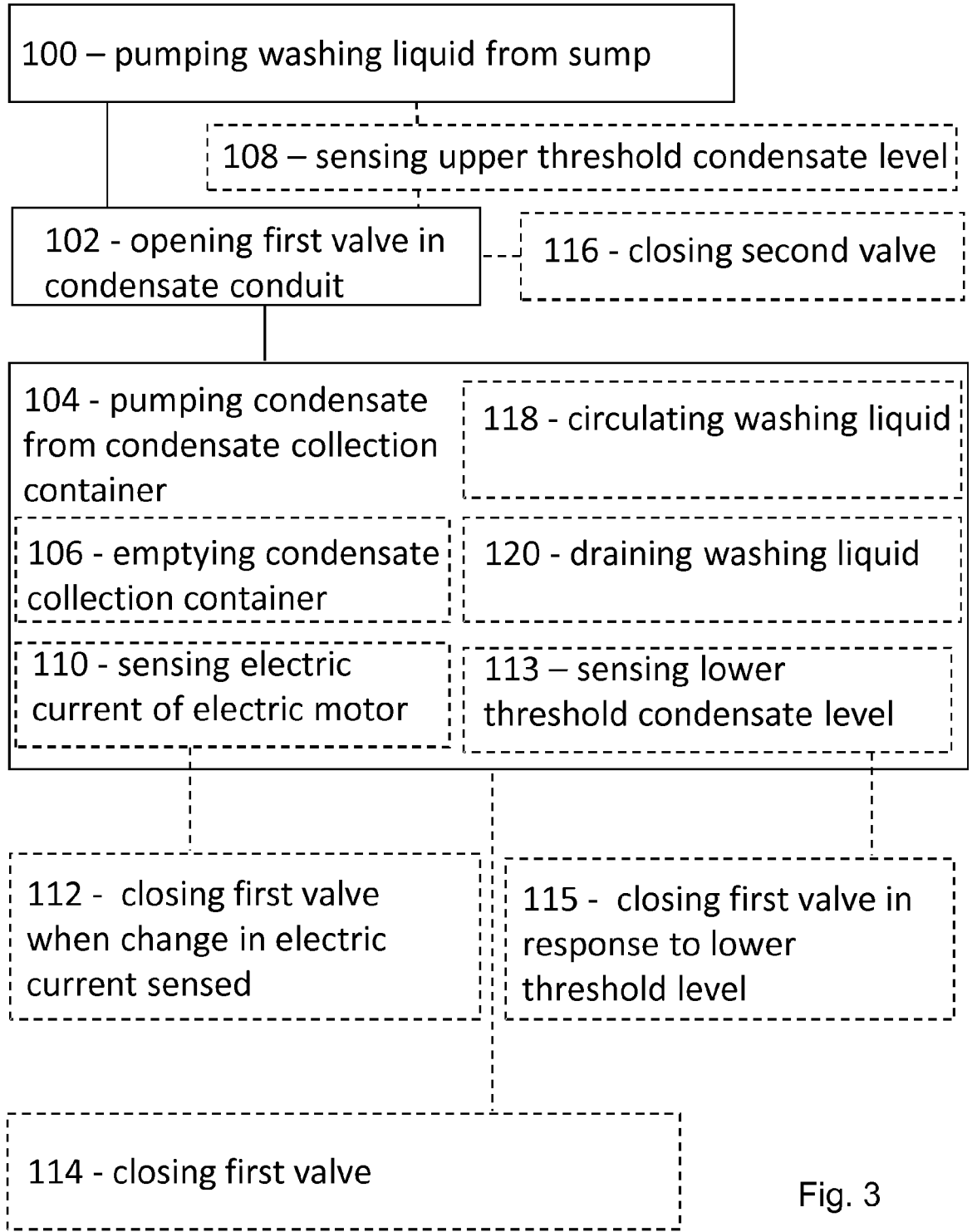
FIG. 3 illustrates embodiments of a method of operating a dishwasher.

FIG. 3 illustrates embodiments of a method of operating a dishwasher. The dishwasher may be a dishwasher according to any aspects and/or embodiments disclosed herein. The dishwasher comprises a washing chamber, a pump device for pumping a washing liquid, a washing liquid circulation circuit, and a heat pump circuit. The heat pump circuit comprises a condenser, an expansion device, an evaporator, and a compressor. The washing liquid circulation circuit comprises a sump arranged at a bottom portion of the washing chamber, a conduit portion in thermal communication with the condenser, and at least one nozzle arranged in the washing chamber. A condensate collection container is associated with the evaporator.

The method comprises steps of:

pumping 100 a washing liquid from the sump using the pump device, opening 102 a first valve in a condensate conduit connecting the condensate collection container with a suction conduit of the pump device, and pumping 104 a condensate from the condensate collection container using the pump device.

According to embodiments, the step of pumping 104 a condensate from the condensate collection container may comprise a step of emptying 106 the condensate collection container.

According to embodiments, the step of opening 102 the first valve may be preceded by a step of sensing 108 an upper threshold condensate level in the condensate collection container. In this manner the condensate collection container may be emptied only when the condensate level has reached a predetermined level in the condensate collection container.

As an alternative, the step of opening 102 the first valve may be performed at regular time intervals.

According to embodiments, the dishwasher may comprise an electric motor for driving the pump device, and the method may comprise steps of:
sensing 110 an electric current of the electric motor during the step of pumping 104 the condensate from the condensate collection container, and
closing 112 the first valve when a change in the electric current of the electric motor is sensed.

According to embodiments, the method may comprise steps of:
sensing 113 a lower threshold condensate level in the condensate collection container during the step of pumping 104 the condensate from the condensate collection container, and
closing 115 the first valve in response to sensing 113 the lower threshold level.

According to embodiments, the method may comprise a step of closing 114 the first valve when a predetermined period of time has passed from opening the first valve. This step may be an alternative to the step of closing 112 the first valve, or to the step of closing 115 the first valve. Alternatively, or additionally this step of closing 114 may be a safety feature to ensure that the first valve is closed in case the step of closing 112 the first valve should fail, or the step of closing 115 the first valve should fail.

According to embodiments, the dishwasher may comprise a second valve arranged in the suction conduit upstream a connection position between the suction conduit and the condensate conduit. The method may comprise a step of:
closing 116 the second valve in connection with the step of opening 102 the first valve. This entails closing the second valve just before, or just after, or simultaneously with the step of opening 102 the first valve.

According to embodiments, the pump device may be a circulation pump arranged in the washing liquid circulation circuit, and wherein the step of pumping 104 a washing liquid from the sump may comprise a step of circulating 118 a washing liquid in the washing liquid circulation circuit using the circulation pump.

According to embodiments, the pump device may be a drain pump connected to the sump and to a washing liquid outlet of the dishwasher, and wherein the step of pumping 104 a washing liquid from the sump may comprise a step of draining 120 a washing liquid from the sump to the washing liquid outlet using the drain pump.

This invention should not be construed as limited to the embodiments set forth herein. A person skilled in the art will realize that different features of the embodiments disclosed herein may be combined to create embodiments other than those described herein, without departing from the scope of the present invention, as defined by the appended claims. Although the invention has been described with reference to example embodiments, many different alterations, modifications and the like will become apparent for those skilled in the art. Therefore, it is to be understood that the foregoing is illustrative of various example embodiments and that the invention is defined only by the appended claims.

As used herein, the term "comprising" or "comprises" is open-ended, and includes one or more stated features, elements, steps, components or functions but does not preclude the presence or addition of one or more other features, elements, steps, components, functions or groups thereof.

The invention claimed is:

1. A method of operating a dishwasher, the dishwasher comprising a washing chamber, a pump device for pumping a washing liquid, a washing liquid circulation circuit, and a heat pump circuit, wherein the heat pump circuit comprises a condenser, an expansion device, an evaporator, and a compressor, wherein the washing liquid circulation circuit comprises a sump arranged at a bottom portion of the washing chamber, a conduit portion in thermal communication with the condenser, and at least one nozzle arranged in the washing chamber, and wherein a condensate collection container is associated with the evaporator,
the method comprising steps of:
pumping a washing liquid from the sump using the pump device,
opening a first valve in a condensate conduit connecting the condensate collection container with a suction conduit of the pump device,
closing a second valve in connection with the step of opening the first valve, wherein the second valve is arranged in the suction conduit upstream of a connection position between the suction conduit and the condensate conduit, and
pumping a condensate from the condensate collection container using the pump device.

2. The method according to claim 1, wherein the step of pumping a condensate from the condensate collection container comprises a step of:
emptying the condensate collection container.

3. The method according to claim 1, wherein the step of opening the first valve is preceded by a step of:
sensing an upper threshold condensate level in the condensate collection container.

4. The method according to claim 1, wherein the dishwasher comprises an electric motor for driving the pump device, and wherein the method comprises steps of:
sensing an electric current of the electric motor during the step of pumping the condensate from the condensate collection container, and
closing the first valve when a change in the electric current of the electric motor is sensed.

5. The method according to claim 1, comprising steps of:
sensing a lower threshold condensate level in the condensate collection container during the step of pumping the condensate from the condensate collection container, and
closing the first valve in response to sensing the lower threshold level.

6. The method according to claim 1, comprising a step of:
closing the first valve when a predetermined period of time has passed from opening the first valve.

7. The method according to claim 1, wherein the pump device is a circulation pump arranged in the washing liquid circulation circuit, and wherein
the step of pumping a washing liquid from the sump comprises
a step of circulating a washing liquid in the washing liquid circulation circuit using the circulation pump.

8. The method according to claim 1, wherein the pump device is a drain pump connected to the sump and to a washing liquid outlet of the dishwasher, and wherein
the step of pumping a washing liquid from the sump comprises
a step of draining a washing liquid from the sump to the washing liquid outlet using the drain pump.

9. The method according to claim 1, wherein the dishwasher further comprises a check valve arranged in the condensate conduit between the first valve and the condensate collection container configured to prevent liquid upstream of the check valve from flowing into the condensate collection container.

10. The method according to claim 3, wherein connection position at which the condensate is introduced to the suction conduit is disposed between the second valve and the pump device, and wherein the step of sensing the upper threshold condensate level in the condensate collection container is preceded by a step of:
closing the second valve during at least a portion of a time that the first valve is open and the pump device is pumping.

11. The method according to claim 1, wherein the dishwasher comprises an electrical motor for driving the pump device, and wherein the method further comprises the steps of:
sensing an electric current of the electric motor during the step of pumping the condensate from the condensate collection container while the second valve is closed, and
closing the first valve in an instance in which a change in the electric current of the electric motor is sensed.

12. The method according to claim 1, wherein the condensate pumped from the condensate collection container is first introduced to the washing chamber and sump via the at least one nozzle arranged in the washing chamber, and wherein the washing liquid pumped from the sump is also re-introduced to the washing chamber and sump via the at least one nozzle.

13. The method according to claim 1, wherein the suction conduit is disposed between the sump and the pump device, such that pumping the washing liquid from the sump using the pump device comprises pumping the washing liquid through the suction conduit.

14. A dishwasher comprising a washing chamber, a pump device for pumping a washing liquid from a sump, a washing liquid circulation circuit, and a heat pump circuit, wherein the heat pump circuit comprises a condenser, an expansion device, an evaporator, and a compressor, wherein the washing liquid circulation circuit comprises the sump arranged at a bottom portion of the washing chamber, a conduit portion in thermal communication with the condenser, and at least one nozzle arranged in the washing chamber, and wherein a condensate collection container is associated with the evaporator,
wherein the dishwasher comprises a condensate conduit connecting the condensate collection container with a suction conduit of the pump device, a first valve arranged in the condensate conduit, such that when the first valve is open the pump device is able to pump a condensate from the condensate collection container, and a second valve arranged in the suction conduit upstream a connection position between the suction conduit and the condensate conduit,
the dishwasher further comprising a control unit configured to control the dishwasher in accordance with the method as defined in claim 1.

15. The dishwasher according to claim 14, wherein a check valve is arranged in the condensate conduit.

16. The dishwasher according to claim 14, wherein the pump device is a circulation pump arranged in the washing liquid circulation circuit.

17. The dishwasher according to claim 14, wherein the pump device is a drain pump connected to the sump and to a washing liquid outlet of the dishwasher.

18. A method of operating a dishwasher, the dishwasher comprising a washing chamber, a pump device for pumping a washing liquid, a washing liquid circulation circuit, and a heat pump circuit, wherein the heat pump circuit comprises a condenser, an expansion device, an evaporator, and a compressor, wherein the washing liquid circulation circuit comprises a sump arranged at a bottom portion of the washing chamber, a conduit portion in thermal communication with the condenser, and at least one nozzle arranged in the washing chamber, and wherein a condensate collection container is associated with the evaporator,
the method comprising steps of:
pumping a washing liquid from the sump using the pump device,
closing a second valve during at least a portion of a time that a first valve is open and the pump device is pumping, wherein the second valve is arranged in a suction conduit upstream of a connection position between the suction conduit and a condensate conduit, such that the connection position at which a condensate is introduced to the suction conduit is disposed between the second valve and the pump device,
sensing an upper threshold condensate level in the condensate collection container,
opening the first valve in the condensate conduit connecting the condensate collection container with the suction conduit of the pump device, and
pumping the condensate from the condensate collection container using the pump device.

* * * * *